US008553268B1

(12) United States Patent
Hasegawa (10) Patent No.: US 8,553,268 B1
(45) Date of Patent: Oct. 8, 2013

(54) PRINTING SYSTEM, IMAGE FORMING APPARATUS, INFORMATION PROCESSING APPARATUS, AND PRINTING METHOD (71) Applicant: Canon Kabushiki Kaisha, Tokyo (JP)

(72) Inventor: Kazuhide Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/896,184

(22) Filed: May 16, 2013

Related U.S. Application Data (62) Division of application No. 13/102,987, filed on May 6, 2011.

(30) Foreign Application Priority Data

Jun. 8, 2010 (JP) .................. 2010-131508

(51) Int. Cl.
G06K 15/02 (2006.01)

(52) U.S. Cl.
USPC ........................................................ 358/1.15

(58) Field of Classification Search
None
See application file for complete search history.

(56) References Cited

U.S. PATENT DOCUMENTS

| 7,315,386 | B1 * | 1/2008 | Shiimori et al. | 358/1.15 |
| 7,652,779 | B2 * | 1/2010 | Wu et al. | 358/1.15 |
| 2002/0126306 | A1 * | 9/2002 | Chohsa et al. | 358/1.13 |
| 2003/0030664 | A1 * | 2/2003 | Parry | 345/744 |
| 2004/0051901 | A1 * | 3/2004 | Fukuda | 358/1.16 |
| 2005/0243362 | A1 * | 11/2005 | Sakuda et al. | 358/1.15 |
| 2005/0279833 | A1 * | 12/2005 | Tanaka | 235/462.46 |
| 2006/0098236 | A1 * | 5/2006 | Yamashita et al. | 358/302 |
| 2007/0195362 | A1 * | 8/2007 | Yamada et al. | 358/1.15 |
| 2008/0100861 | A1 * | 5/2008 | Sakura | 358/1.15 |
| 2009/0009795 | A1 * | 1/2009 | Kong | 358/1.15 |
| 2009/0064002 | A1 * | 3/2009 | Katsumata et al. | 715/762 |
| 2009/0128847 | A1 * | 5/2009 | Ito | 358/1.15 |
| 2009/0168099 | A1 * | 7/2009 | Yamada | 358/1.15 |
| 2009/0225366 | A1 * | 9/2009 | Emori | 358/1.15 |
| 2009/0251725 | A1 * | 10/2009 | Kuwahara et al. | 358/1.15 |
| 2010/0030707 | A1 * | 2/2010 | Jingu | 705/400 |
| 2010/0060929 | A1 * | 3/2010 | Koizumi | 358/1.15 |
| 2010/0088382 | A1 * | 4/2010 | Lee et al. | 709/206 |
| 2010/0091324 | A1 * | 4/2010 | Kohama | 358/1.15 |
| 2011/0199640 | A1 * | 8/2011 | Shirai | 358/1.15 |
| 2011/0299111 | A1 * | 12/2011 | Hasegawa | 358/1.15 |
| 2012/0194844 | A1 * | 8/2012 | Natori | 358/1.13 |
| 2013/0135672 | A1 * | 5/2013 | Watanabe | 358/1.15 |

FOREIGN PATENT DOCUMENTS

JP  2008-152545 A  7/2008

OTHER PUBLICATIONS

Apple Computer, Inc., "Plug-in Registration", Mar. 2005.

* cited by examiner

Primary Examiner — Tammy Pham
Assistant Examiner — Edwin S Leland, III
(74) Attorney, Agent, or Firm — Fitzpatrick, Cella, Harper & Scinto (57) ABSTRACT An image forming apparatus which configures a printing system in which a server, comprises: a generation unit configured to generate, as plug-in information, information that associates a user interface provided by the image forming apparatus with the application provided by a server; a holding unit configured to hold the generated plug-in information; a sending unit configured to send the plug-in information to the information processing apparatus when the plug-in information has not been registered in an information processing apparatus; and a providing unit configured, when direct printing is designated, to provide, as the user interface to the information processing apparatus based on the plug-in information held by the holding unit, a direct print screen for accepting a print setting corresponding to the application that has generated print data to be printed.

12 Claims, 8 Drawing Sheets

| DATE | DOCUMENT NAME | USER NAME | FILE NAME | CLOUD APPLICATION USED | FILE SAVE DESTINATION | SAVE DESTINATION ADDRESS |
|---|---|---|---|---|---|---|
| 2009/12/01 | Print Spec | UserA | Printspec.pdf | xxx word | Directory | D:￥UserA￥Document |
| 2009/12/01 | Weekly | UserA | Weekly.pdf | xxx spread | Server | http://davhost/usera/ |
| 2009/12/01 | New Model | UserA | Newmodel.pdf | xxx word | Device | box 49 |
| 2009/12/01 | Flow Report | UserA | Flowreport.pdf | xxx presentation | None | |

FIG. 7A

FIG. 7B

PRINTING SYSTEM, IMAGE FORMING APPARATUS, INFORMATION PROCESSING APPARATUS, AND PRINTING METHOD This application is a divisional of U.S. application Ser. No. 13/102,987, filed May 6, 2011 (pending), the contents of which are incorporated herein by reference.

BACKGROUND OF THE INVENTION

1. Field of the Invention

The present invention relates to a printing system capable of receiving document data via a network using RUI (Remote User Interface), and printing image data.

2. Description of the Related Art

Conventionally, as disclosed in Japanese Patent Laid-Open No. 2008-152545, when the user performs a print execution operation from an application in a client host, a print setting screen for a print server appears on a browser. The print server makes a setting for print data based on print settings sent from the client host via the browser. The print server generates print data via a printer driver from a print file sent to a print folder. Recently, an application form called a cloud application has been provided. In the cloud application, an application server executes application processing itself, and a browser in a client host displays an application screen to allow an operation. When the user designates printing on the application screen, the cloud application generates general-purpose print data such as PDF (Portable Document Format) data or XPS (XML Paper Specification) data. The cloud application can directly send the general-purpose print data to a printer via a direct print utility such as RUI without the mediacy of a printer driver, thereby printing it.

SUMMARY OF THE INVENTION

The present invention solves at least one of the above problems. The present invention provides an image processing system in which an image forming apparatus manages plug-in information for the image forming apparatus by associating a RUI screen provided by the image forming apparatus with a cloud application, thereby improving user friendliness because the user can register a plug-in in an information processing apparatus through a RUI launch instruction to the image forming apparatus without being conscious of it.

Further, the present invention provides an image processing system in which the image forming apparatus indirectly cooperates with the cloud application for direct print processing via the RUI screen by using the RUI screen provided by the image forming apparatus as the portal of the cloud application, thereby improving user friendliness using the RUI screen as the print setting screen (direct print screen) of the cloud application.

According to one aspect of the present invention, there is provided a printing system in which a server, an image forming apparatus, and an information processing apparatus are connected via a network, and the image forming apparatus can directly print print data generated by an application provided by the server, wherein the image forming apparatus includes: a generation unit configured to generate, as plug-in information, information that associates a user interface provided by the image forming apparatus with the application provided by the server; a holding unit configured to hold the generated plug-in information; a sending unit configured to send the plug-in information to the information processing apparatus when the plug-in information has not been registered in the information processing apparatus; and a providing unit configured, when direct printing is designated, to provide, as the user interface to the information processing apparatus based on the plug-in information held by the holding unit, a direct print screen for accepting a print setting corresponding to the application that has generated print data to be printed, and the information processing apparatus includes: a registration unit configured to register the plug-in information sent from the image forming apparatus; an acquisition unit configured to acquire the print setting made by a user on the print setting screen of the application provided by the server; a display unit configured to reflect and to display the print setting acquired by the acquisition unit based on the plug-in information on the direct print screen provided by the providing unit of the image forming apparatus when direct printing is designated for print data that is generated by the application provided by the server based on the print setting made by the user; and a designation unit configured to designate, on the direct print screen provided by the image forming apparatus, the print data acquired from the application provided by the server.

According to another aspect of the present invention, there is provided an image forming apparatus which configures a printing system in which a server, the image forming apparatus, and an information processing apparatus are connected via a network, and the image forming apparatus can directly print print data generated by an application provided by the server, comprising: a generation unit configured to generate, as plug-in information, information that associates a user interface provided by the image forming apparatus with the application provided by the server; a holding unit configured to hold the generated plug-in information; a sending unit configured to send the plug-in information to the information processing apparatus when the plug-in information has not been registered in the information processing apparatus; and a providing unit configured, when direct printing is designated, to provide, as the user interface to the information processing apparatus based on the plug-in information held by the holding unit, a direct print screen for accepting a print setting corresponding to the application that has generated print data to be printed.

According to another aspect of the present invention, there is provided an information processing apparatus which configures a printing system in which a server, an image forming apparatus, and the information processing apparatus are connected via a network, and the image forming apparatus can directly print print data generated by an application provided by the server, comprising: a registration unit configured to register plug-in information sent from the image forming apparatus; an acquisition unit configured to acquire a print setting made by a user on a print setting screen of the application provided by the server; a display unit configured to reflect and displays the print setting acquired by the acquisition unit based on the plug-in information on a direct print screen provided by a providing unit of the image forming apparatus when direct printing is designated for print data that is generated by the application provided by the server based on the print setting made by the user; and a designation unit configured to designate, on the direct print screen provided by the image forming apparatus, the print data acquired from the application provided by the server.

According to another aspect of the present invention, there is provided an information processing apparatus which can be connected to a server and an image forming apparatus via a network, comprising: an acquisition unit configured, when a user designates printing of data generated using an application provided by the server, to acquire a print setting made by the user on a print setting screen sent from the server in accordance with the designation; and a sending unit configured to receive the data from the server, and to send, to the image forming apparatus, the received data and the print setting acquired by the acquisition unit.

According to another aspect of the present invention, there is provided a printing method in a printing system in which a server, an image forming apparatus, and an information processing apparatus are connected via a network, and the image forming apparatus can directly print print data generated by an application provided by the server, comprising: a generation step of causing a generation unit of the image forming apparatus to generate, as plug-in information, information that associates a user interface provided by the image forming apparatus with the application provided by the server; a management step of causing a management unit of the image forming apparatus to manage the generated plug-in information; a sending step of causing a sending unit of the image forming apparatus to send the plug-in information to the information processing apparatus when the plug-in information has not been registered in the information processing apparatus; a providing step of causing a providing unit of the image forming apparatus to, when direct printing is designated, provide, as the user interface to the information processing apparatus based on the plug-in information managed in the management step, a direct print screen for accepting a print setting corresponding to the application that has generated print data to be printed; a registration step of causing a registration unit of the information processing apparatus to register the plug-in information sent from the image forming apparatus; an acquisition step of causing an acquisition unit of the information processing apparatus to acquire the print setting made by a user on the print setting screen of the application provided by the server; a display step of causing a display unit of the information processing apparatus to reflect and display the print setting acquired in the acquisition step based on the plug-in information on the direct print screen provided in the providing step of the image forming apparatus when direct printing is designated for print data that is generated by the application provided by the server based on the print setting made by the user; and a designation step of causing a designation unit of the information processing apparatus to designate, on the direct print screen provided by the image forming apparatus, the print data acquired from the application provided by the server.

According to the present invention, the image forming apparatus manages plug-in information for the image forming apparatus by associating a RUI screen provided by the image forming apparatus with a cloud application. The user can register a plug-in in an information processing apparatus through a RUI launch instruction to the image forming apparatus without being conscious of it.

Also, the image forming apparatus indirectly cooperates with the cloud application for direct print processing via the RUI screen by using the RUI screen as the portal of the cloud application. The present invention can therefore provide an image processing system which can use the RUI screen as the print setting screen of the cloud application and improve user friendliness.

Further features of the present invention will become apparent from the following description of exemplary embodiments (with reference to the attached drawings).

DESCRIPTION OF THE EMBODIMENTS

For example, in the printing system disclosed in Japanese Patent Laid-Open No. 2008-152545, the printer driver of a print server generates print data, so a printer driver needs to be prepared in the print server for each printer model used by the user. To display a print setting screen provided by the print server, a print setting plug-in needs to be prepared in advance in each client host.

Since a cloud application provides print processing up to generation of print data, the user needs to separately explicitly select print data downloaded from the print server and print it. In addition, the user needs to make print settings at a plurality of portions, that is, print settings in the cloud application and those via a direct print utility such as RUI. Repetitive print setting complicates a print instruction.

First Embodiment

[System Configuration]

Figure 1A:
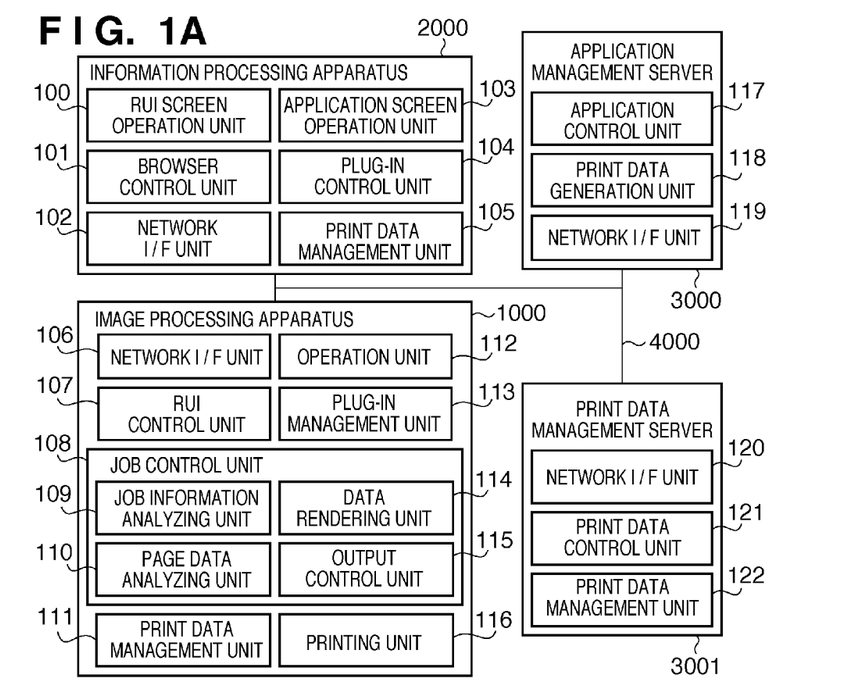
FIGS. 1A and 1B are views showing the configuration of a printing system.
Figure 1B:
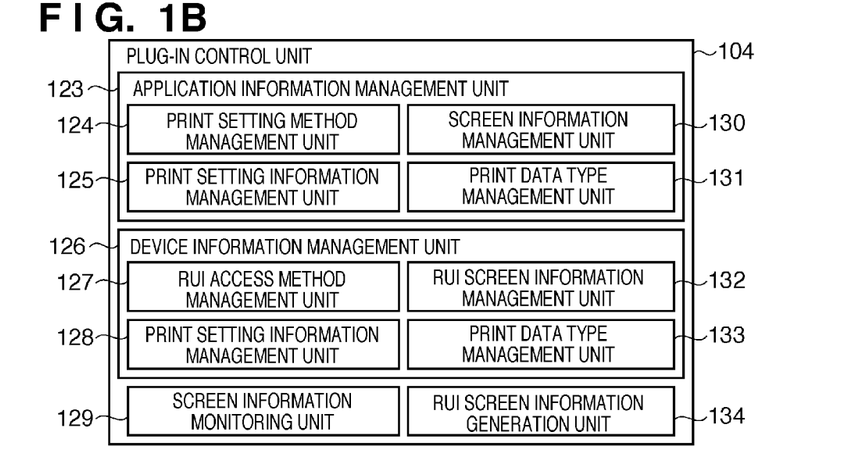

An embodiment of the present invention will be described below with reference to the accompanying drawings. FIGS. 1A and 1B are views showing the configuration of a printing system according to the first embodiment. Referring to FIG. 1A, an image processing apparatus 1000 is connectable to an information processing apparatus 2000, application management server 3000, and print data management server 3001 via a network 4000. Each of the information processing apparatus 2000, application management server 3000, and print data management server 3001 can be a commercially available computer including a CPU, display, keyboard, mouse, HDD, memory, and network communication interface. Each processing may be implemented by executing a program stored in a storage unit such as a memory by the CPU of a computer, or by circuits. In the embodiment, for descriptive convenience, various apparatuses are connected via the network 4000 in FIG. 1A. This network can be any network such as an intranet or the Internet. For example, the image processing apparatus 1000 and information processing apparatus 2000 may reside in an intranet, and the application management server 3000 and print data management server 3001 may reside in the Internet.

The function of each unit in each apparatus will be described. In the embodiment, the RUI (Remote User Interface) indicates a remote-controllable user interface provided by an application. In the information processing apparatus 2000, a RUI screen operation unit 100 is used to designate direct print processing for document data printable by the image processing apparatus 1000 as job data without the mediacy of a printer driver or the like. The application screen operation unit 103 displays an operation screen on the information processing apparatus 2000 for an application executed by the application management server 3000, and accepts various operations from the user. A browser control unit 101 performs various control operations for browser contents displayed on the RUI screen operation unit 100 and an application screen operation unit 103.

A plug-in control unit 104 monitors screen information displayed on the application screen operation unit 103, and information exchanged between the application management server 3000 and the browser control unit 101. The plug-in control unit 104 executes additional display control for the RUI screen operation unit 100. A print data management unit 105 saves and manages print data downloaded from the application management server 3000. A network I/F unit 102 externally sends/receives job data.

FIG. 1B shows details of the plug-in control unit 104. An application information management unit 123 manages various kinds of information of an application that are displayed on the application screen operation unit 103 via the browser control unit 101. A device information management unit 126 manages various kinds of information of the RUI that are displayed on the RUI screen operation unit 100 via the browser control unit 101.

A screen information monitoring unit 129 monitors screen information displayed on the application screen operation unit 103 via the browser control unit 101. Based on an operation to an application that is acquired by the screen information monitoring unit 129, a RUI screen information generation unit 134 generates information to be input to the RUI screen operation unit 100.

A print setting method management unit 124 manages a print setting method for each application, for example, manages whether the print settings of an application can be acquired as general-purpose information such as a job ticket or need to be acquired from screen information because it is application-specific information. As for print settings (for example, N-up, double-sided, imposition, and scaling) settable in an application, a print setting information management unit 125 manages print setting information for each application.

As various print settings which are displayed on the application screen when the print settings of an application need to be acquired from screen information, a screen information management unit 130 manages various kinds of screen information such as screen position information, pull-down menu, radio button, and text input. As for the format (for example, PDF, XPS, TIFF, or JPEG) of print data to be generated by the application management server 3000, a print data type management unit 131 manages the print data type for each application.

In the device information management unit 126, a RUI access method management unit 127 manages the network address of the image processing apparatus 1000 which performs RUI control, and URI information of RUI contents. As for print settings (for example, N-up, double-sided, imposition, and scaling) settable on the RUI direct print screen, a print setting information management unit 128 manages print setting information of the image processing apparatus 1000. A RUI screen information management unit 132 manages the input designation method (for example, pull-down menu, radio button, or text input) of various print settings to be displayed on the RUI direct print screen.

As for the format (for example, PDF, XPS, TIFF, or JPEG) of print data direct-printable by the image processing apparatus 1000, a print data type management unit 133 manages the print data type. With this arrangement, the plug-in control unit 104 can instruct the application management server to generate print data in a print data format capable of direct printing.

The application management server 3000 includes an application control unit 117 which performs various control operations for an application, a print data generation unit 118 which generates print data, and a network I/F unit 119 which externally sends/receives application information and print data.

The print data management server 3001 includes a network I/F unit 120 which sends/receives print data, a print data control unit 121 which performs various control operations regarding print data, and a print data management unit 122 which manages print data sent from the information processing apparatus 2000.

In the image processing apparatus 1000, the network I/F unit 106 externally sends/receives job data. An operation unit 112 directly accepts an instruction request from the user. The RUI control unit 107 executes RUI control for direct print processing with respect to the information processing apparatus 2000. A plug-in management unit 113 manages various kinds of information of a plug-in to be executed by the plug-in control unit 104.

A job control unit 108 performs various control operations for job data received from a network I/F unit 106 via a RUI control unit 107. A print data management unit 111 saves and manages print data processed by the job control unit 108. A printing unit 116 forms an image in accordance with an image signal, and prints it out. In the job control unit 108, a job information analyzing unit 109 analyzes each job attribute of job data.

A page data analyzing unit 110 analyzes each page data of job data, and converts it into intermediate data (for example, display list) of each object. Also, the page data analyzing unit 110 accumulates and saves the converted intermediate data in a storage unit (not shown) such as a RAM. A data rendering unit 114 converts accumulated/saved intermediate data of each object into bitmap data of each object or each page. An output control unit 115 converts bitmap data of each page into a video signal, and executes image transfer processing in synchronization with image formation/paper feed processing by the printing unit 116.

[Direct Print Processing]

Processing of directly printing, as job data, print data of an application running on the application management server 3000 in the image processing system having this configuration will be explained in detail with reference to the sequence charts of FIGS. 2 and 3, and FIGS. 4A to 6. Assume that the user inputs various instructions using the information processing apparatus 2000. In this specification, "direct print processing (direct print)" indicates a processing method capable of executing print processing by the image processing apparatus for data generated by an application or the like in the server without the mediacy of a printer driver corresponding to the image processing apparatus. More specifically, the user can instruct a predetermined image processing apparatus via his information processing apparatus to print arbitrary data in a driverless manner.

[Plug-in Information Registration Processing]

Figure 2:
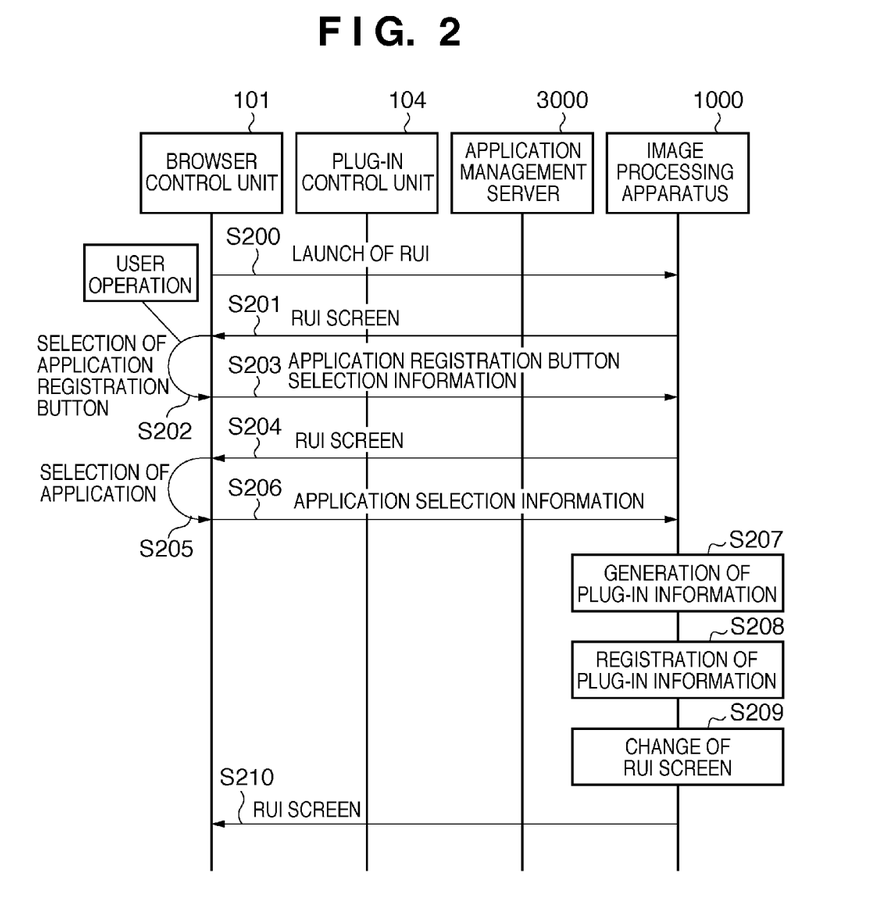
FIG. 2 is a sequence chart showing plug-in information registration processing.

FIG. 2 is a sequence chart showing plug-in information registration processing in the image processing system according to the first embodiment. In FIG. 2, upon accepting a RUI launch instruction from the user, the browser control unit 101 of the information processing apparatus 2000 notifies the image processing apparatus 1000 of the launch of the RUI (step S200). The image processing apparatus 1000 controls the RUI control unit 107 to notify the browser control unit 101 of the information processing apparatus 2000 of a RUI screen (FIG. 4A to be described later) in accordance with the received RUI launch notification (step S201).

Figure 4A:
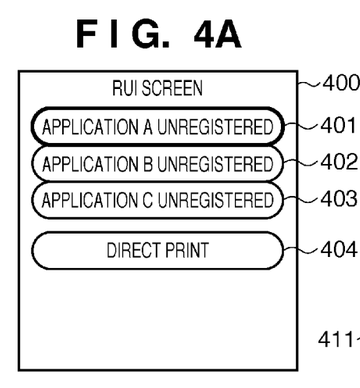
FIGS. 4A, 4B, 4C, 4D, and 4E are views each exemplifying a RUI screen.

The user selects an application registration button from the RUI screen displayed on the information processing apparatus (step S202). The browser control unit 101 sends the application registration button selection information to the image processing apparatus 1000 (step S203). The image processing apparatus 1000 controls the RUI control unit 107 to send the RUI screen serving as an application registration screen (FIG. 4B to be described later) to the browser control unit 101 of the information processing apparatus 2000 in accordance with the application registration button selection information received from the information processing apparatus 2000 (step S204). The user selects an application on the application registration screen displayed on the information processing apparatus 2000 (step S205). The browser control unit 101 of the information processing apparatus 2000 sends the application selection information to the image processing apparatus 1000 (step S206).

The image processing apparatus 1000 controls the plug-in management unit 113 to generate plug-in information corresponding to the application selection information in accordance with the received application selection information (step S207). The image processing apparatus 1000 controls the plug-in management unit 113 to register the plug-in information in association with an application launch button selected by the user on the RUI screen (step S208). After that, the image processing apparatus 1000 controls the RUI control unit 107 to change the RUI screen (FIG. 4C to be described later) (step S209), and sends the RUI screen changed by the RUI control unit 107 to the browser control unit 101 of the information processing apparatus 2000 (step S210).

Figure 4B:
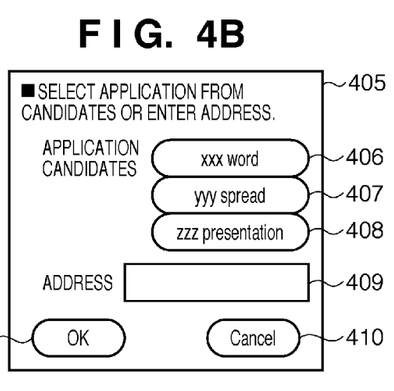

FIGS. 4A to 4E are views each exemplifying a RUI screen displayed on the RUI screen operation unit 100 according to the first embodiment. As shown in FIG. 4A, in the initial state, a RUI screen 400 displays application launch buttons 401, 402, and 403 each capable of registering an application. When a corresponding application is not registered, "unregistered" is displayed. When the user presses an application launch button which displays "unregistered", an application registration screen shown in FIG. 4B appears. In FIG. 4B, an application registration screen 405 displays application candidate buttons 406, 407, and 408 for which application information has been registered in advance. Only by pressing a button, the user can register an application. The application registration screen 405 includes an application execution URI entry field 409. The user enters an application execution URI and presses an OK button 411, inputting detailed information of an application whose application information has not been registered.

Figure 4C:
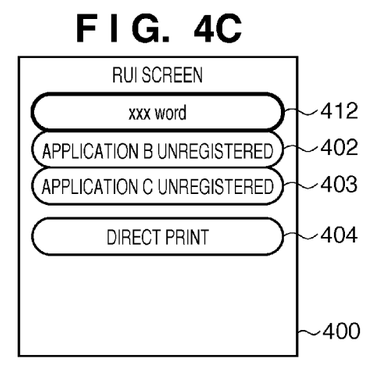

FIG. 4C shows a RUI screen 400 when the user selects the application launch button 401 in FIG. 4A and the application candidate button 406 in FIG. 4B. Since an application corresponding to the application launch button 401 has been registered, the application launch button 401 has changed to an application launch button 412 which displays the application name. Such a screen for launching an application is implemented as the first screen.

[Print Processing]

Figure 3:
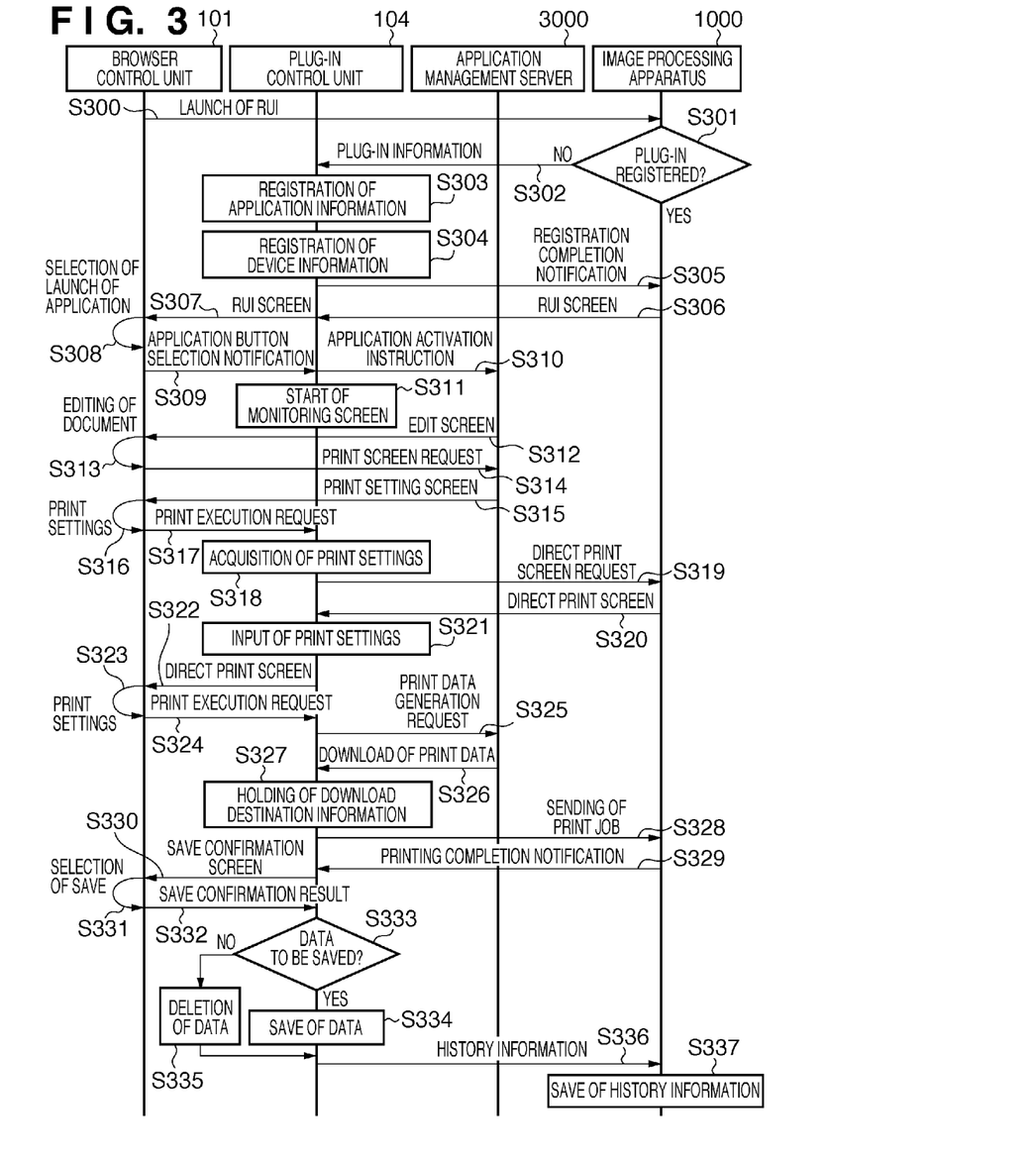
FIG. 3 is a sequence chart showing print processing from a cloud application.

FIG. 3 is a sequence chart showing print processing from a cloud application in the image processing system according to the first embodiment. In FIG. 3, upon accepting a RUI launch instruction from the user, the browser control unit 101 of the information processing apparatus 2000 notifies the image processing apparatus 1000 of the RUI launch instruction (step S300). The image processing apparatus 1000 determines whether plug-in information has already been registered in the plug-in control unit 104 of the information processing apparatus 2000 from which the RUI launch instruction has been accepted (step S301). Whether plug-in information has been registered can be determined by holding, in the plug-in management unit 113 of the image processing apparatus 1000, identification information of the browser control unit 101 of the information processing apparatus 2000 in which plug-in information has been registered. If the image processing apparatus 1000 determines that no plug-in information has been registered, it sends plug-in information to the plug-in control unit 104 of the information processing apparatus 2000 (step S302).

Upon accepting the plug-in information from the image processing apparatus 1000, the plug-in control unit 104 of the information processing apparatus 2000 reads out application information from the accepted plug-in information, and registers it in the application information management unit 123 (step S303). Subsequently, the plug-in control unit 104 reads out device information from the plug-in information, and registers it in the device information management unit 126 (step S304). Upon completion of registering the application information and device information, the plug-in control unit 104 sends a plug-in registration completion notification in response to a plug-in information notification from the image processing apparatus 1000 (step S305).

Figure 5A:
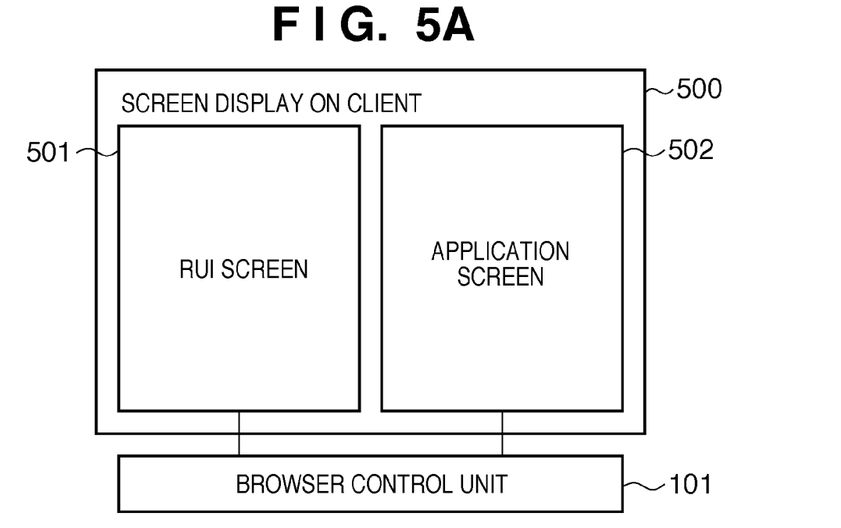
FIGS. 5A and 5B are views showing the cooperation between screens via a plug-in control unit 104.
Figure 5B:
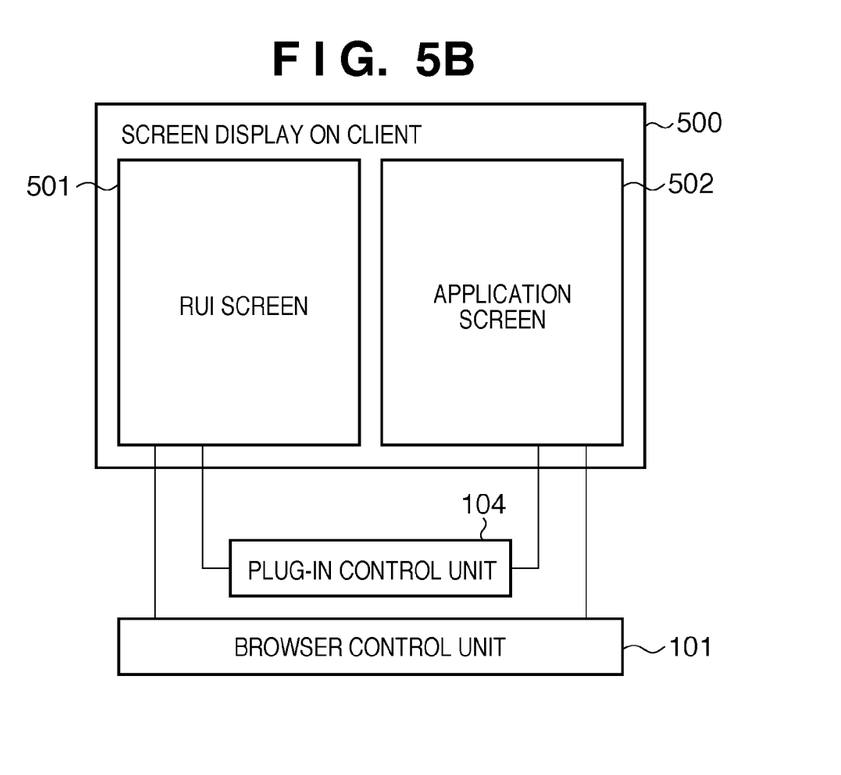

FIGS. 5A and 5B are views showing the cooperation between screens displayed on the information processing apparatus 2000 by the plug-in control unit 104 according to the first embodiment. FIG. 5A shows a state before plug-in registration. A screen display 500 on the display of the information processing apparatus 2000 includes a RUI screen 501 displayed by the RUI screen operation unit 100 and an application screen 502 displayed by the application screen operation unit 103. Before completion of registering application information and device information by the plug-in control unit 104, the browser control unit 101 independently controls display of the RUI screen 501 and application screen 502 and input from them. To the contrary, FIG. 5B shows a state after plug-in registration. Upon completion of registering application information and device information by the plug-in control unit 104, display of the RUI screen 501 and application screen 502 and input from them can cooperate with each other via the plug-in control unit 104.

After the plug-in information notification (step S302), the image processing apparatus 1000 waits for a response from the plug-in control unit 104 (step S305), and sends a RUI screen to the plug-in control unit 104 (step S306). If the image processing apparatus 1000 determines in step S301 that the plug-in has already been registered, it directly sends a RUI screen to the plug-in control unit 104. Upon accepting the RUI screen information from the image processing apparatus 1000, the plug-in control unit 104 of the information processing apparatus 2000 transfers the RUI screen information to the browser control unit 101 (step S307). In this way, the browser control unit 101 of the information processing apparatus 2000 and the image processing apparatus 1000 communicate with each other via the plug-in control unit 104.

The browser control unit 101 of the information processing apparatus 2000 accepts selection of an application launch button from the user via the RUI screen (step S308). After that, the browser control unit 101 notifies the plug-in control unit 104 of the selected application launch button (step S309). The plug-in control unit 104 issues an application launch instruction to the application management server 3000 in accordance with the application launch selection notification from the browser control unit 101 (step S310). The plug-in control unit 104 starts monitoring an operation to the application screen which is performed between the browser control unit 101 of the information processing apparatus 2000 and the application management server 3000 (step S311). Note that the user can generate various data using the launched application. Examples of the application are one for editing a document, and one for editing an image.

The browser control unit 101 of the information processing apparatus 2000 displays an application screen in accordance with an application screen received from the application management server 3000 (step S312). The browser control unit 101 accepts an operation input by the user via the application screen operation unit 103 (step S313). If the screen needs to be updated in the application itself of the application management server 3000, the browser control unit 101 sends the request to the application management server 3000 (step S314). In this case, a print setting screen is requested in accordance with a print instruction from the user.

The browser control unit 101 updates the application screen display in accordance with an application screen sent from the application management server 3000 in response to the request to the application management server 3000 (step S315). The browser control unit 101 accepts a print setting operation which is input by the user to the application screen via the application screen operation unit 103 (step S316). The browser control unit 101 sends a print execution request in accordance with a print execution instruction from the user. At this time, the plug-in control unit 104 temporarily acquires the request to the application management server 3000 by monitoring an operation to the application screen (step S317).

The plug-in control unit 104 reads out print settings for the application from the acquired print execution request and temporarily saves them (step S318). Hence, print settings made by the user via the application screen can be acquired. The plug-in control unit 104 then sends a direct print screen request to the image processing apparatus 1000 (step S319). The image processing apparatus 1000 sends a direct print screen to the plug-in control unit 104 in accordance with the direct print screen request sent from the plug-in control unit 104 (step S320). Upon accepting the direct print screen, the plug-in control unit 104 reads out the print settings on the application screen that are temporarily saved, and enters them in the respective print setting item entry fields of the direct print screen, updating the direct print screen (step S321). The plug-in control unit 104 sends the updated direct print screen to the browser control unit 101 (step S322).

Figure 4D:
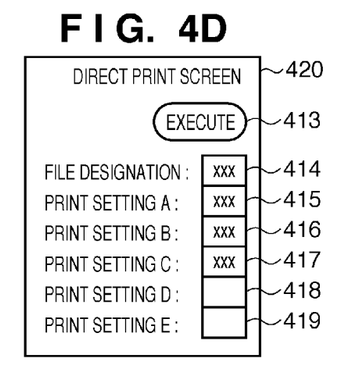

FIG. 4D shows a direct print screen updated by the plug-in control unit 104 in step S321. Such a screen for direct printing is implemented as the second screen. In FIG. 4D, a direct print screen 420 has a file designation field 414 for executing direct printing, and the plug-in control unit 104 enters a provisional file name. The plug-in control unit 104 replaces the name of a file to actually undergo direct printing and a path to the file with the name of a file downloaded from the application management server 3000 and a path to this file. This processing will be described later. Similarly, print settings 415 to 417 have reflected print settings on the application screen in response to the entry of the print settings by the plug-in control unit 104 in step S321. That is, the plug-in control unit 104 controls display to display the print settings acquired by the plug-in control unit 104. Print settings 418 and 419 are not provided on the application screen, and are specific to the image processing apparatus 1000. The user can individually add a setting and execute direct printing.

In FIG. 3, the browser control unit 101 accepts a print setting operation which is input by the user to the RUI direct print screen via the RUI screen operation unit 100 (step S323). The browser control unit 101 sends a print execution request to the plug-in control unit 104 in accordance with a print execution instruction (pressing of a print execution button 413) from the user (step S324). Upon accepting the print execution to the RUI direct print screen, the plug-in control unit 104 sends a print data generation request to the application management server 3000 (step S325).

After the application management server 3000 generates print data, the plug-in control unit 104 downloads the generated print data from the application management server 3000 (step S326). The application information management unit 123 may be set in advance as the download destination of print data in the information processing apparatus 2000. Alternatively, the application screen operation unit 103 may prompt the user to designate the download destination via the browser control unit 101.

The plug-in control unit 104 temporarily holds the download destination information of the print data downloaded from the application management server 3000 (step S327). The plug-in control unit 104 updates the entry content of the file designation field 414 of the direct print screen 420 to a path to the download destination of the actually downloaded print data, and sends a direct print job to the image processing apparatus 1000 (step S328). The direct print job contains at least the print data downloaded from the application management server 3000, and the print settings acquired by the plug-in control unit 104. After executing the direct print job, the image processing apparatus 1000 notifies the plug-in control unit 104 of the completion of the print job (step S329). Upon accepting the print job completion notification from the image processing apparatus 1000, the plug-in control unit 104 sends a save confirmation screen for the downloaded print data to the browser control unit 101 (step S330).

Figure 4E:
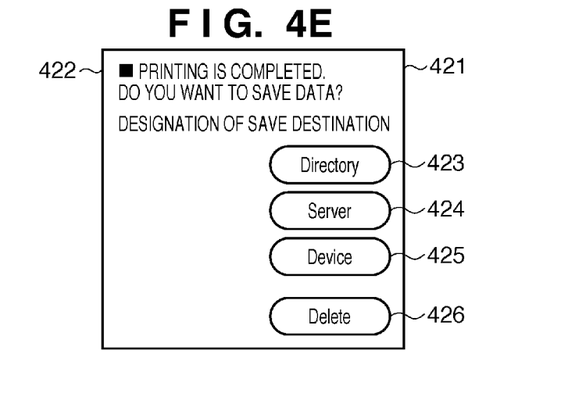

FIG. 4E shows a print data confirmation screen displayed on the RUI operation screen by the plug-in control unit 104. In FIG. 4E, a print data conformation screen 421 displays a printing completion result 422, and further allows the user to select processing for print data temporarily saved after print processing. For example, as shown in FIG. 4E, when deleting print data, the user selects a delete button 426. When moving print data to another save destination for reuse, the user can select one of the buttons 423, 424, and 425 to designate a location where he wants to save the print data.

For example, when saving print data in an arbitrary directory within the information processing apparatus 2000, the user can designate it using the button 423. When saving print data in an external storage such as a Web DAV provided by the print data management server 3001, the user can designate it using the button 424. When the user presses the button 425 to designate save in the image processing apparatus 1000, print data itself downloaded from the application management server 3000 can be saved in the print data management unit 111, or it can also be saved in the bitmap data format processed by the job control unit 108. Note that selection items serving as save destinations are not limited to the above ones, and may be added or deleted, as needed. The number of save destinations is not limited to one.

Then, the browser control unit 101 accepts a save destination confirmation operation input by the user via a print data confirmation screen displayed via the RUI screen operation unit 100 (step S331). The browser control unit 101 notifies the plug-in control unit 104 of a save destination confirmation result in accordance with the save destination confirmation operation by the user (step S332). The plug-in control unit 104 then determines the save destination confirmation result (step S333). If the save destination confirmation result is designation of the print data save destination (when the user has pressed one of the buttons 423, 424, and 425), the plug-in control unit 104 saves the print data downloaded from the application management server 3000 in accordance with the designated save destination (step S334).

If the save destination confirmation result is a print data deletion instruction (when the user has pressed the delete button 426), the plug-in control unit 104 deletes the print data downloaded from the application management server 3000 (step S335). Upon completion of saving or deleting the print data, the plug-in control unit 104 sends history information of the direct print processing result to the image processing apparatus 1000 (step S336). The image processing apparatus 1000 saves, as the job history, the history information of the direct print processing result that is sent from the plug-in control unit 104 (step S337). As a result, the direct print processing ends.

[History Information Management Table]

Figure 6:
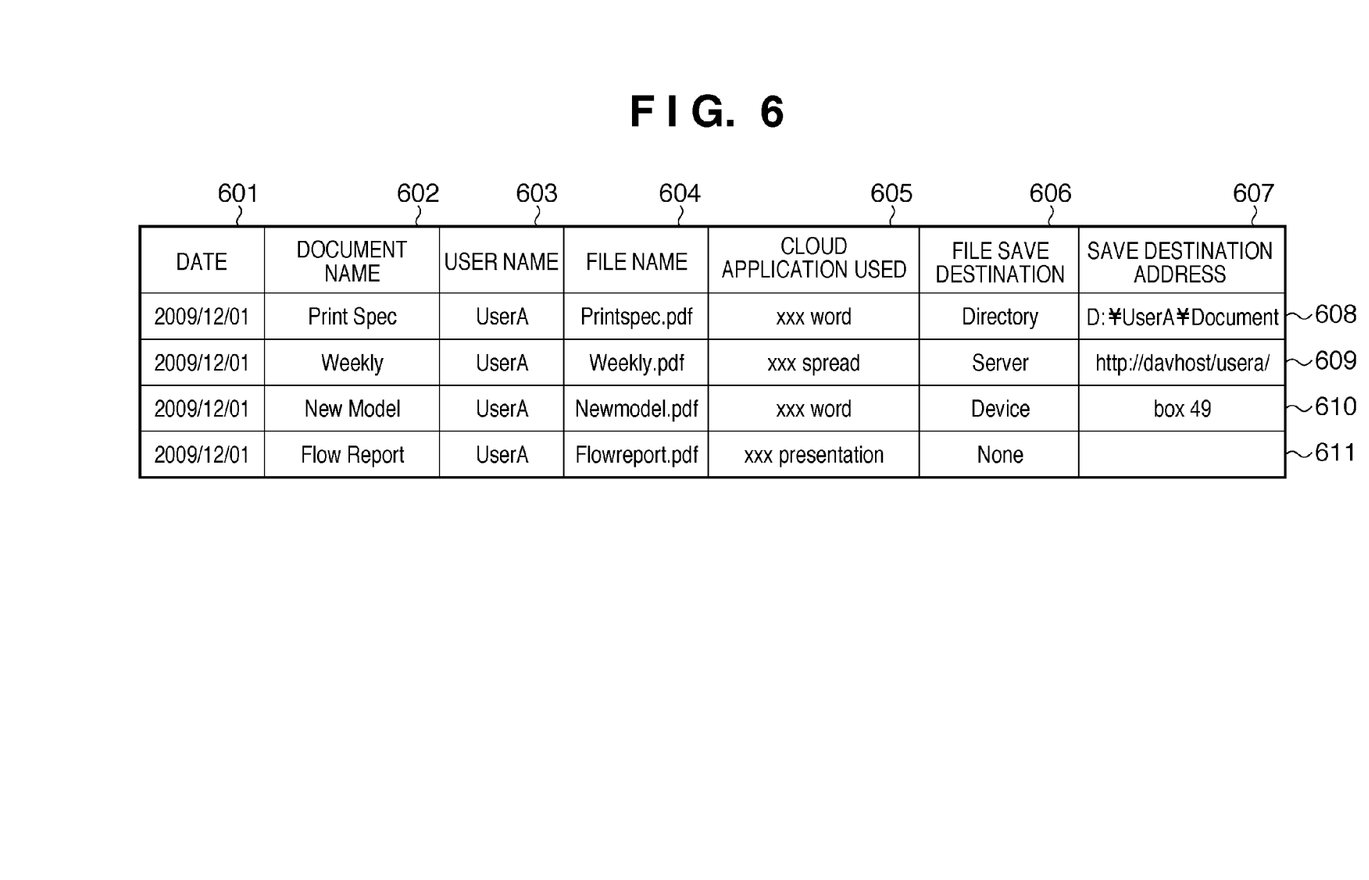
FIG. 6 is a table exemplifying a history information management table.

FIG. 6 is a table exemplifying a history information management table in the image processing apparatus 1000. In FIG. 6, the history information management table records pieces of information about a date 601 when a job was processed, a document name 602, a user name 603, a print data file name 604, an application name 605 indicating the generation source of print data having undergone direct printing, a print data save destination confirmation result field 606, and a save destination address 607. Note that the history information items listed here are merely examples, and a history information item may be added or deleted, as needed in management.

When the save destination confirmation result field 606 exhibits "Directory", an arbitrary directory path in the information processing apparatus 2000 is recorded in the field of the save destination address 607, as represented by an item 608. When the save destination confirmation result field 606 exhibits "Server", information about a path to a file in the print data management server 3001 is recorded in the save destination address 607, as represented by an item 609. When the save destination confirmation result field 606 exhibits "Device", the print data storage destination in the image processing apparatus 1000 is recorded in the save destination address 607, as represented by an item 610. When the save destination confirmation result by the plug-in control unit 104 is a print data deletion instruction, "None" is recorded in the save destination confirmation result field 606, and the save destination address becomes blank, as represented by an item 611.

As described above, an application provided by the server is associated with an application launch button on a RUI screen provided by the image processing apparatus 1000, and the image processing apparatus 1000 manages plug-in information. The user can register the plug-in of the image forming apparatus in the information processing apparatus 2000 through a RUI launch instruction to the image forming apparatus without being conscious of it. By using a RUI screen provided by the image forming apparatus as the portal of a cloud application provided by the server, the cloud application and direct print processing from the RUI screen indirectly cooperate with each other. The RUI screen provided by the image forming apparatus can be used as a print setting screen for the cloud application, improving user friendliness.

Second Embodiment

In the first embodiment, the image processing apparatus 1000 is configured to record a print data save destination in the history information management table shown in FIG. 6. It is also possible to execute a re-print job from the RUI screen by acquiring print data using the print data save destination recorded in the history information management table.

Figure 7A:
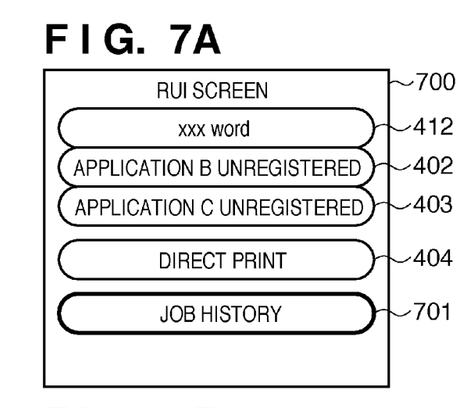
FIGS. 7A and 7B are views each exemplifying a job history screen.
Figure 7B:
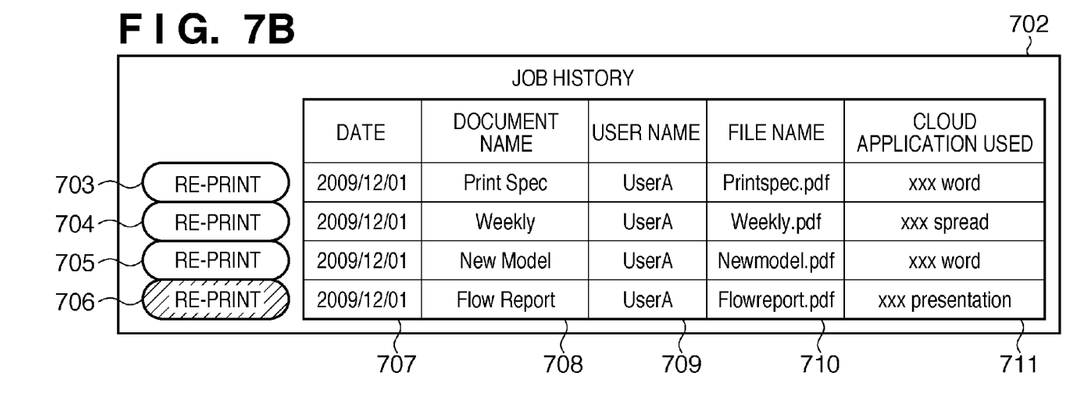

FIGS. 7A and 7B are views each exemplifying a job history screen displayed on a RUI screen operation unit 100 according to the second embodiment. In FIG. 7A, a RUI initial screen 700 has a job history display button 701. When the user presses the button, a job history screen shown in FIG. 7B appears. In FIG. 7B, a job history screen 702 displays, as job history information, a date 707, a document name 708, a user name 709, a print data file name 710, and an application name 711 indicating the generation source of print data. From these pieces of information, the user can identify a job to undergo re-printing. The displayed information is acquired from the history information management table shown in FIG. 6, and the items are not limited to the displayed ones and are arbitrary as long as they are necessary to identify a job by the user. Also, re-print execution buttons 703 to 706 for executing re-printing are displayed for respective jobs. As for a job for which a print data deletion instruction is issued in save destination confirmation after executing a direct print job, the re-print execution button 706 is grayed out to inhibit re-printing from the job history. It is also possible to hide in advance a history for which re-printing is impossible.

[Re-Print Processing]

Figure 8:
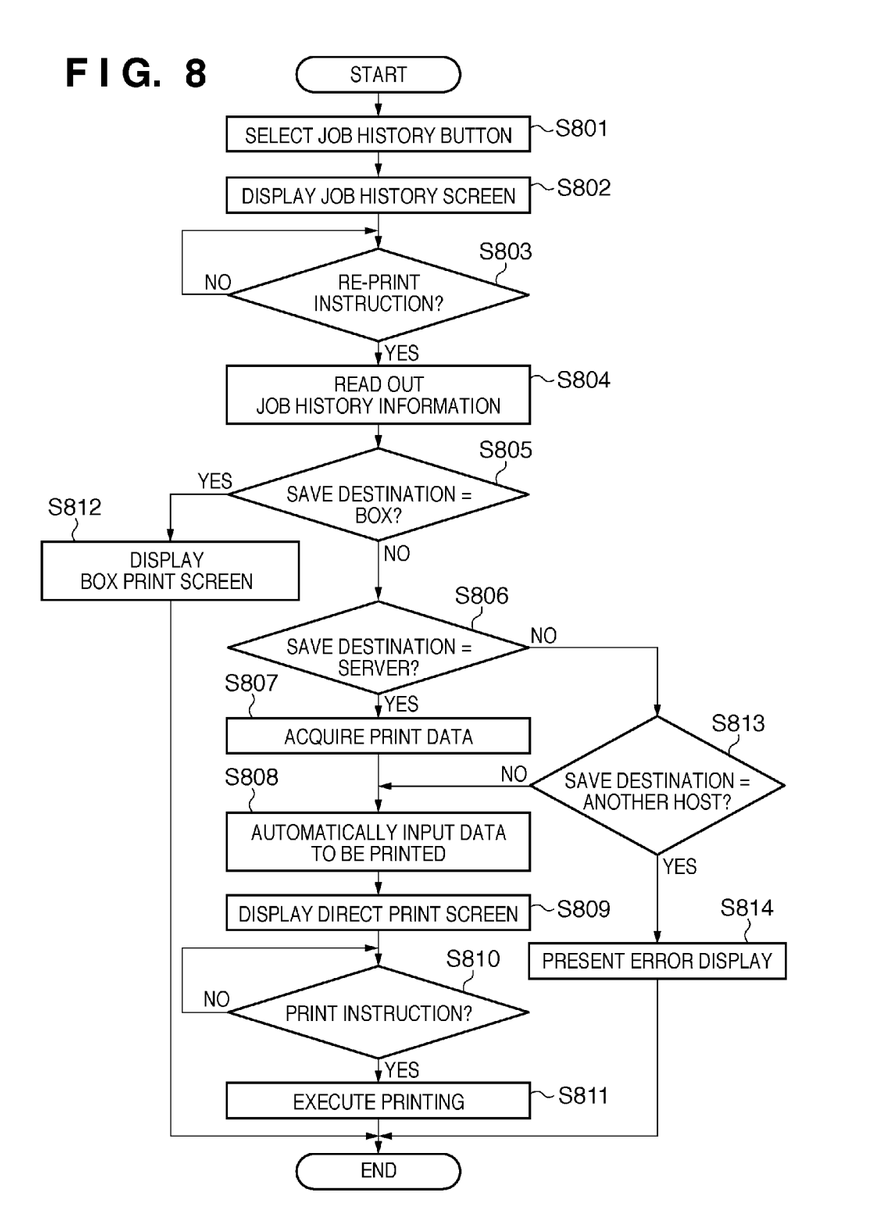
FIG. 8 is a flowchart showing re-print processing based on the job history.

FIG. 8 is a flowchart showing re-print processing based on the job history in a plug-in control unit 104 according to the second embodiment. In FIG. 8, the plug-in control unit 104 detects, via a browser control unit 101, that the user has pressed the job history display button 701 in the RUI initial screen 700 (step S801).

In response to pressing of the job history display button 701, the plug-in control unit 104 instructs the RUI screen operation unit 100 via the browser control unit 101 to display the job history screen 702 (step S802). After the RUI screen operation unit 100 displays the job history screen 702, the plug-in control unit 104 monitors pressing of the re-print execution buttons 703 to 705 (step S803). If the user designates re-printing based on the job history using one of the re-print execution buttons 703 to 705 (YES in step S803), the plug-in control unit 104 reads out job history information of a selected job from an image processing apparatus 1000 (step S804).

The plug-in control unit 104 confirms, from the job history information, whether the print data save destination exists within the image processing apparatus 1000 (step S805). If the print data save destination exists within the image processing apparatus 1000 (YES in step S805), the plug-in control unit 104 displays, via the browser control unit 101, a saved job print instruction screen on the RUI screen operation unit 100 (step S812). This print instruction corresponds to normal BOX print processing in the image processing apparatus 1000. Note that the case in which print data exists in the image processing apparatus 1000 is a case in which the value of a file save destination confirmation result field 606 in the history information management table is "Device". The process then ends. If the print data save destination does not exist within the image processing apparatus 1000 (NO in step S805), the plug-in control unit 104 confirms, from the job history information, whether the print data save destination exists within a print data management server 3001 (step S806). The case in which print data exists in the print data management server 3001 is a case in which the value of the file save destination confirmation result field 606 in the history information management table is "Server".

If the print data save destination does not exist within the print data management server 3001 (NO in step S806), the plug-in control unit 104 confirms, from the job history information, whether the job has undergone direct printing by an information processing apparatus 2000 which displays the RUI screen (step S813). The case in which no direct printing has been done is a case in which the value of the file save destination confirmation result field 606 in the history information management table is "Directory". If the job has not undergone direct printing by the information processing apparatus 2000 which displays the RUI screen (YES in step S813), the plug-in control unit 104 presents an error display (step S814). As the error display, an image processing apparatus which has executed direct printing for a job, and the host name and address information of the image processing apparatus can be stored in history information and displayed. Thereafter, the process ends.

If the print data save destination exists within the print data management server 3001 (YES in step S806), the plug-in control unit 104 acquires print data from the print data management server 3001 (step S807). The plug-in control unit 104 updates the entry content of a file designation field 414 in a direct print screen 420 to a path to the storage destination of the acquired print data (step S808). If the plug-in control unit 104 determines in step S813 that print data exists in the information processing apparatus 2000 (NO in step S813), it sets a path to the storage destination. The plug-in control unit 104 displays a direct print screen on the RUI screen operation unit via the browser control unit 101 (step S809). The plug-in control unit 104 monitors a print execution instruction (pressing of a print execution button 413) from the user (step S810). If the user designates execution of direct printing by pressing the print execution button 413 (YES in step S810), the plug-in control unit 104 sends a direct print job execution instruction to the image processing apparatus 1000. In response to this, the image processing apparatus 1000 executes printing (step S811). The process then ends.

As described above, print data is acquired using a print data save destination recorded in the history information management table. The user can execute a re-print job without being conscious of the print data save destination.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-131508, filed Jun. 8, 2010, which is hereby incorporated by reference herein in its entirety.

What is claimed is:

1. An information processing apparatus which can communicate with a server which generates print data, and an image forming apparatus having a print unit, the information processing apparatus comprising:
   a display unit configured, in response to accepting a print instruction for application data edited by a user via an application screen, to acquire a print setting screen from the server and to display the print setting screen;
   a monitoring unit configured, after a print setting has been set via the print setting screen displayed by the display unit, to monitor an input of a user operation for sending a print execution request to the server;
   an acquisition unit configured, in a case where the monitoring unit detects the input of the user operation for sending the print execution request to the server, to acquire the print setting before the print execution request is sent to the server, wherein the print setting acquired by the acquisition unit is not sent to the server;
   a reflection unit configured, after a direct print screen is received from the image forming apparatus, to reflect the print setting acquired by the acquisition unit to a print setting of the direct print screen; and
   a sending unit configured, in a case where a print instruction is input via the direct print screen that the print setting has been reflected by the reflection unit, to send the print setting of the direct print screen to the server, to receive print data generated based on the sent print setting by the server, and to send the received print data to the image forming apparatus.

2. The information processing apparatus according to claim 1, wherein the monitoring unit starts monitoring of the input of the user operation in response to launching an application for editing the application data.

3. The information processing apparatus according to claim 1, further comprising:
   an accepting unit configured to accept designation of a save destination for the print data sent to the image forming apparatus by the sending unit.

4. The information processing apparatus according to claim 1, wherein
   the display unit is realized by a web browser, and
   the monitoring unit, the acquisition unit, the reflection unit, and the sending unit are realized by a plug-in of the web browser.

5. An information processing method executed by an information processing apparatus which can communicate with a server which generates print data, and an image forming apparatus having a print unit, the information processing method comprising:
   a display step of, in response to accepting a print instruction for application data edited by a user via an application screen, acquiring a print setting screen from the server and displaying the print setting screen;
   a monitoring step of, after a print setting has been set via the print setting screen displayed in the display step, monitoring an input of a user operation for sending a print execution request to the server;
   an acquiring step of, in a case where the input of the user operation for sending the print execution request to the server is detected in the monitoring step, acquiring the print setting before the print execution request is sent to the server, wherein the print setting acquired in the acquiring step is not sent to the server;
   a reflecting step of, after a direct print screen is received from the image forming apparatus, reflecting the print setting acquired in the acquiring step to a print setting of the direct print screen; and a sending step of, in a case where a print instruction is input via the direct print screen that the print setting has been reflected in the reflecting step, sending the print setting of the direct print screen to the server, receiving print data generated based on the sent print setting by the server, and sending the received print data to the image forming apparatus.

6. The information processing method according to claim 5, wherein, in the monitoring step, monitoring of the input of the user operation is started in response to launching an application for editing the application data.

7. The information processing method according to claim 6, further comprising:
an accepting step of accepting designation of a save destination for the print data sent to the image forming apparatus in the sending step.

8. The information processing method according to claim 6, wherein
the display step is realized by a web browser, and
the monitoring step, the acquiring step, the reflecting step, and the sending step are realized by a plug-in of the web browser.

9. A non-transitory computer readable storage medium storing a computer program for making a computer operate as an information processing apparatus which can communicate with a server which generates print data, and an image forming apparatus having a print unit, the information processing apparatus comprising:
a display unit configured, in response to accepting a print instruction for application data edited by a user via an application screen, to acquire a print setting screen from the server and to display the print setting screen;
a monitoring unit configured, after a print setting has been set via the print setting screen displayed by the display unit, to monitor an input of a user operation for sending a print execution request to the server;
an acquisition unit configured, in a case where the monitoring unit detects the input of the user operation for sending the print execution request to the server, to acquire the print setting before the print execution request is sent to the server, wherein the print setting acquired by the acquisition unit is not sent to the server;
a reflection unit configured, after a direct print screen is received from the image forming apparatus, to reflect the print setting acquired by the acquisition unit to a print setting of the direct print screen; and
a sending unit configured, in a case where a print instruction is input via the direct print screen that the print setting has been reflected by the reflection unit, to send the print setting of the direct print screen to the server, to receive print data generated based on the sent print setting by the server, and to send the received print data to the image forming apparatus.

10. The non-transitory computer readable storage medium according to claim 9, wherein the monitoring unit starts monitoring of the input of the user operation in response to launching an application for editing the application data.

11. The non-transitory computer readable storage medium according to claim 9, further comprising:
an accepting unit configured to accept designation of a save destination for the print data sent to the image forming apparatus by the sending unit.

12. The non-transitory computer readable storage medium according to claim 9, wherein
the display unit is realized by a web browser, and
the monitoring unit, the acquisition unit, the reflection unit, and the sending unit are realized by a plug-in of the web browser.

* * * * *